Patented May 25, 1926.

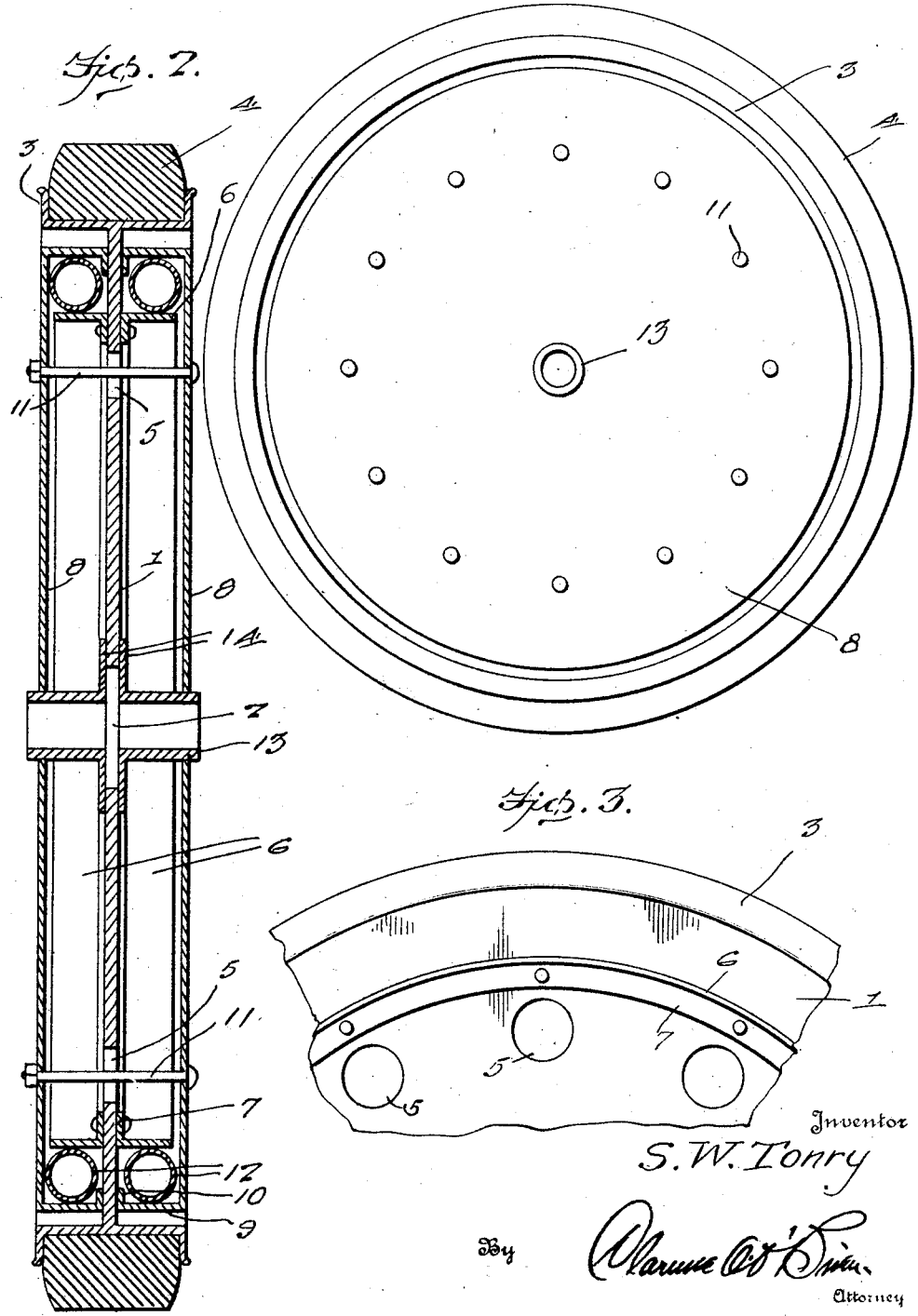

1,586,271

UNITED STATES PATENT OFFICE.

STEPHEN W. TONRY, OF BOSTON, MASSACHUSETTS.

RESILIENT AUTOMOBILE WHEEL STRUCTURE.

Application filed February 25, 1925. Serial No. 11,457.

This invention relates to an improved wheel of the resilient type which is especially but not necessarily designed for use upon automobiles.

My principal aim is to generally improve upon wheels of this class heretofore patented and marketed by providing a structure which is comparatively simple, inexpensive, and very practical in construction, whereby rendering it advantageous over prior devices of simpler design.

The features, advantages, and structural details serving to bring about the same will become apparent from the following description and drawing.

In the accompanying drawing forming a part of this application and in which like numerals are employed to designate like parts throughout the same:—

Figure 1 is a side elevation of a wheel constructed in accordance with the present invention.

Fig. 2 is a central vertical section through the structure seen in Fig. 1, the scale being enlarged.

Fig. 3 is a fragmentary elevational view of one of the major parts of the improved structure.

Referring to the drawings in detail, the reference character 1 designates a discular plate provided at its center with a relatively large shaft opening 2. The peripheral portion of the plate is equipped with an integral rim 3 for reception of a solid tire 4. Disposed between the rim and the opening 2 is an annular row of circumferentially spaced transverse openings 5. Between the openings and the rim are outstanding flanges 6 having radially directed portions 7 fastened by rivets or the like to the plate 1 as shown.

These flanges constitute what may be referred to as ring-like abutments and they serve in a manner to be hereinafter described. Disposed on opposite sides of the plate 1 and in parallelism therewith, are duplicate disks 8. The peripheral edges of the plates are directed laterally inwardly as at 9 and the extremities bent angularly as at 10 to bear slidably against the opposed sides of the plate 1. The disks are held in assembled relation by a plurality of bolts 11. These bolts extend through the aforesaid openings 5. It will be noted that the inturned flanges 9 are spaced radially from the abutments 6 and chambers are thereby provided between the parts to accommodate pneumatic cushion tubes 12.

Cylindrical hub sections 13 are carried by the disks 8 at the centers thereof, and each section has an outstanding flange 14 having slidable contact with the discular plate 1.

Obviously, when the wheel is in use, the disks 8 which are bolted together and form a complete unit move with the axle and hub section against the pneumatic tube, the latter serving to absorb the shock and the rubber tire carried by the relatively movable plate and rim serving to aid in accomplishing this result. Any approved means may be employed for the fixed connection of the disks 8 to the hub section 13 but I have deemed it unnecessary to illustrate any means for said purpose especially in view of the fact that it is within the purview of my invention to form each disk 8 integral with its respective hub section or fixedly connect the two together by welding or other appropriate means.

It is thought that the foregoing description taken in connection with the accompanying drawings will enable persons skilled in the art to which the invention relates to obtain a clear understanding of the same. For this reason a more lengthy description is thought unnecessary.

Although I have shown and described the preferred embodiment of the invention, it is to be understood that minor changes within the field of the invention claimed, may be resorted to if desired.

Having thus described my invention, what I claim as new is:—

A wheel structure comprising a pair of spaced disks, a hub in association with the central portions of said disks, said hub being composed of spaced sections, a discular plate arranged between said disks, said plate having an opening at its center cooperating with and disposed between the sections of said hub, said plate being formed with circumferentially spaced transverse openings and with a tire rim at its periphery, the peripheral portions of said disks being directed inwardly toward each other, and at a point spaced inwardly of said rim and slidably contacting the opposite sides of said plate, bolts connecting said disks together and extending through said openings to permit relative radial movement of said plate with respect to the disks, flanges carried by said plate, and pneumatic tubes arranged between said flanges and the peripheral portions of said disks.

In testimony whereof I affix my signature.

STEPHEN W. TONRY.